(12) United States Patent
Ion et al.

(10) Patent No.: US 10,372,139 B2
(45) Date of Patent: Aug. 6, 2019

(54) COLOR FILTER ARRAY FOR MACHINE VISION SYSTEM

(71) Applicant: Apple Inc., Cupertino, CA (US)

(72) Inventors: Lucian Ion, Santa Clara, CA (US); Mahesh Krishnamurthi, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 15/713,125

(22) Filed: Sep. 22, 2017

(65) Prior Publication Data

US 2018/0088588 A1   Mar. 29, 2018

Related U.S. Application Data

(60) Provisional application No. 62/398,613, filed on Sep. 23, 2016.

(51) Int. Cl.
| | |
|---|---|
| *G05D 1/02* | (2006.01) |
| *G02B 5/20* | (2006.01) |
| *G06K 9/00* | (2006.01) |
| *G06K 9/20* | (2006.01) |
| *H04N 9/04* | (2006.01) |
| *G01S 13/93* | (2006.01) |

(52) U.S. Cl.
CPC ........... *G05D 1/0246* (2013.01); *G02B 5/201* (2013.01); *G05D 1/0251* (2013.01); *G06K 9/00798* (2013.01); *G06K 9/2018* (2013.01); *H04N 9/045* (2013.01); *G01S 2013/9342* (2013.01); *G06T 2207/30252* (2013.01)

(58) Field of Classification Search
CPC .... G05D 1/0246; G05D 1/0251; H04N 9/045; G06K 9/2018; G06K 9/00798; G02B 5/201; G06T 2207/30252; G01S 2013/9342
See application file for complete search history.

(56) References Cited

U.S. PATENT DOCUMENTS

| | | | |
|---|---|---|---|
| 5,914,749 A | 6/1999 | Bawolek et al. | |
| 6,366,319 B1 | 4/2002 | Bills | |
| 2009/0266978 A1* | 10/2009 | Lenchenkov | G02B 5/201 250/226 |
| 2014/0307095 A1* | 10/2014 | Wierich | H04N 9/735 348/148 |
| 2015/0215550 A1 | 7/2015 | Frenzel et al. | |
| 2017/0134650 A1* | 5/2017 | Seger | G06K 9/00791 |

FOREIGN PATENT DOCUMENTS

EP   3182453 A1   6/2017

OTHER PUBLICATIONS

International Search Report and Written Opinion for Application No. PCT/US2017/053003, dated Dec. 1, 2017, 16 pages.
International Search Report and Written Opinion for Application No. PCT/US2017/053003, dated Apr. 4, 2019, 10 pages.

* cited by examiner

*Primary Examiner* — Michael J Zanelli
(74) *Attorney, Agent, or Firm* — Sterne, Kessler, Goldstein & Fox P.L.L.C.

(57) ABSTRACT

A machine vision system having a first camera configured to be coupled to a vehicle. The camera includes an optical stack having a color filter array with a plurality of sections. Each section includes a first white filter portion, a yellow filter portion, a magenta filter portion, and a second white filter portion.

23 Claims, 16 Drawing Sheets

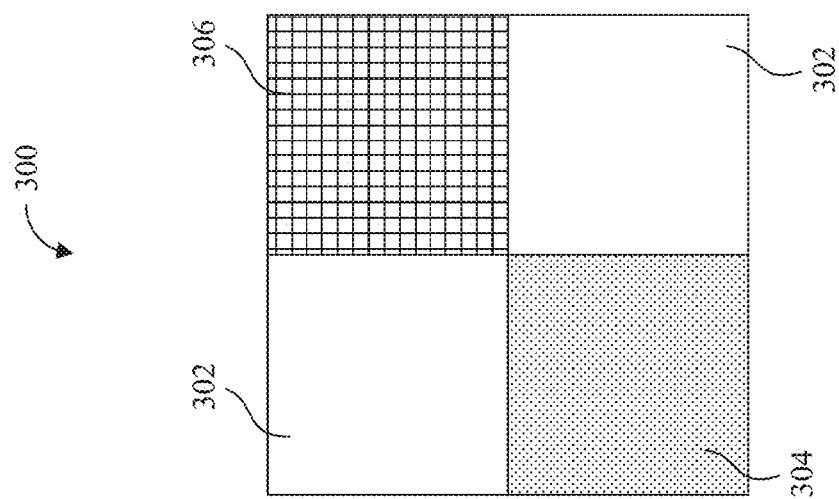
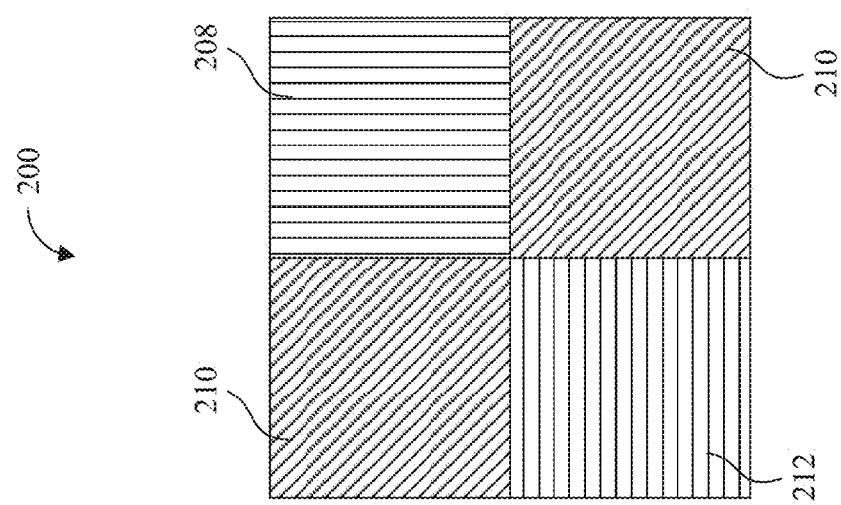

| Description | Base color | Cx | Cy |
|---|---|---|---|
| Ambulance | Red | 0.629613681 | 0.325213685 |
| Brown Sign – 1 | Brown | 0.562511258 | 0.390482083 |
| Concrete | Grey | 0.32229867 | 0.340534659 |
| Asphalt | Black | 0.302233071 | 0.302917017 |
| Construction Worker – Neon | Light green | 0.372793922 | 0.465196563 |
| Construction Worker – Orange 2 | Orange | 0.509077544 | 0.398854249 |
| Blue cop light | Blue | 0.236249169 | 0.299298055 |
| Green sign | Green | 0.243724565 | 0.397388477 |
| Yellow lane marker | Yellow | 0.42144158 | 0.424455554 |
| White lane marker | White | 0.315547714 | 0.334988725 |

*FIG. 12*

| | Low light (2 lux), SNR per patch comparison | | | | | | |
|---|---|---|---|---|---|---|---|
| RGGB Capture, No CCM | 2 | 8 | 5 | 3 | 5 | 9 | |
| | 5 | 4 | 3 | 2 | 9 | 8 | |
| | 2 | 6 | 2 | 11 | 3 | 5 | |
| | 15 | 12 | 7 | 4 | 2 | 2 | |
| Average SNR = 5.583333 | | | | | | | |
| RGGB with XYZ & Display CCM applied | 2 | 6 | 4 | 3 | 4 | 9 | |
| | 4 | 3 | 2 | 2 | 8 | 7 | |
| | 2 | 5 | 1 | 10 | 2 | 4 | |
| | 13 | 11 | 6 | 3 | 2 | 2 | |
| Average SNR = 4.791666 | | | | | | | |

*FIG. 14*

| Low light (2 lux), SNR per patch comparison | | | | | | |
|---|---|---|---|---|---|---|
| 9 | 24 | 18 | 10 | 23 | 25 |
| 21 | 17 | 23 | 10 | 21 | 27 |
| 8 | 12 | 20 | 25 | 21 | 15 |
| 29 | 26 | 23 | 13 | 7 | 4 |

WYMY Capture, No CCM

Average SNR = 17.958333

| | | | | | |
|---|---|---|---|---|---|
| 2 | 4 | 3 | 2 | 3 | 7 |
| 3 | 2 | 1 | 1 | 6 | 4 |
| 1 | 5 | 1 | 7 | 1 | 3 |
| 8 | 7 | 4 | 2 | 2 | 1 |

WYMW with XYZ & Display CCM applied

Average SNR = 3.333333

| | | | | | |
|---|---|---|---|---|---|
| 9 | 25 | 19 | 12 | 23 | 30 |
| 23 | 17 | 26 | 10 | 25 | 29 |
| 7 | 15 | 22 | 29 | 22 | 15 |
| 33 | 26 | 26 | 12 | 8 | 4 |

WYMY with noise optimized (NDO) CCM

Average SNR = 19.458333

*FIG. 15*

COLOR FILTER ARRAY FOR MACHINE VISION SYSTEM

CROSS-REFERENCE TO RELATED APPLICATIONS

This application claims benefit under 35 U.S.C. § 119(e) of U.S. Provisional Patent Application No. 62/398,613, filed Sep. 23, 2016, titled "Color Filter Array for Machine Vision System," which is incorporated herein in its entirety by reference thereto.

BACKGROUND

Field

The present disclosure relates to color filter arrays. More specifically, embodiments of the present disclosure relate to color filter arrays for machine vision systems and vehicles, for example autonomous vehicles, having cameras with the color filter arrays.

Background

Machine visions systems are being used for an increasing number of applications, for example, in driver assistance systems for vehicles such as cars. These include backup cameras, lane change assistance, and parallel parking assistance systems. As vehicles progress toward fully autonomous operation, it is important to develop reliable machine vision systems that operate properly in many different conditions, for example, lighting conditions, weather conditions, traffic conditions, and use environments.

One of the most difficult operating conditions for a machine vision system is nighttime operation, for example, driving at night. This is because the low light levels make it difficult for a machine vision system to function properly at night. Certain distinctions that can be made by the human eye at night, for example, on a dark street with glare from a street light or reflection off of a street sign, are more challenging for a machine vision system. In order to achieve widespread adoption of fully autonomous vehicles, however, it is important that the machine vision system is reliable for nighttime driving.

BRIEF SUMMARY in some embodiments, a machine vision system includes a first camera configured to be coupled to a vehicle. In some embodiments, the camera can have an optical stack including a color filter array having a plurality of sections. In some embodiments, each section can include a first white filter portion, a yellow filter portion, and a magenta filter portion. In some embodiments, each section can include a second white filter portion. In some embodiments, the first white filter portion and the second white filter portion can be disposed diagonally with respect to each other. In some embodiments, the machine vision system can be configured to provide information to an autonomous vehicle to operate the autonomous vehicle along a path, for example, a roadway.

In some embodiments, the optical stack can include a lens and an image sensor. In some embodiments, the image sensor can include a plurality of pixels. In some embodiments, each pixel can have a section of the color filter array disposed over the pixel. In some embodiments, the optical stack can include, in order, a lens, an infrared filter, a microlens layer, the color filter array, and an image sensor.

In some embodiments, the machine vision system can include a central processing unit coupled to the first camera. In some embodiments, the central processing unit can be configured to analyze an image captured by the first camera. In some embodiments, the central processing unit can be configured to identify at least one of a vehicle, a street light, a traffic sign, and a roadway marking in the image captured by the first camera. In some embodiments, the central processing unit can be configured to analyze the image captured by the first camera using a noise difference optimized color space. In some embodiments, the central processing unit can be configured to analyze the image captured by the first camera using an automotive reference color chart. In some embodiments, the first camera can be configured to operate in lighting conditions of less than 1 lux.

In some embodiments, the machine vision system can include a second camera configured to be coupled to the vehicle. In some embodiments, the second camera can have a second optical stack including a second color filter array having a plurality of sections. In some embodiments, each section can include a third white filter portion, a second yellow filter portion, a second magenta filter portion, and a fourth white filter portion. In some embodiments, the first camera and the second camera can be coupled to a central processing unit of the vehicle. In some embodiments, the central processing unit can be configured to send vehicle maneuver instructions in response to image data received from the first camera and the second camera. In some embodiments, the vehicle can be an autonomous vehicle.

In some embodiments, an autonomous vehicle can include a plurality of cameras. In some embodiments, a first camera can include a color filter array having a plurality of sections. In some embodiments, each section can include a first white filter portion, a yellow filter portion, a magenta filter portion, and a second white filter portion. In some embodiments, the first camera can be configured to provide information to the autonomous vehicle to operate the autonomous vehicle along a path. In some embodiments, the first camera can be configured to operate in lighting conditions of less than 1 lux. In some embodiments, the first camera can be disposed on a front end of the vehicle. In some embodiments, the autonomous vehicle can be an electric vehicle.

In some embodiments, the autonomous vehicle can include a central processing unit coupled to the camera. In some embodiments, the camera can be configured to send image data to the central processing unit. In some embodiments, the central processing unit can be configured to detect at least one of a vehicle, a street light, a traffic sign, and a roadway marking from the image data.

In some embodiments, a method of operating an autonomous vehicle can include capturing a first image by a camera with a color filter array including a section having a first white filter portion, a yellow filter portion, a magenta filter portion, and a second white filter portion. In some embodiments, the method can include analyzing the first image with a central processing unit. In some embodiments, the method can include determining whether a vehicle maneuver is required. In some embodiments, the method can include executing a vehicle maneuver. In some embodiments, the vehicle maneuver can be at least one of accelerating, braking, or turning.

In some embodiments, analyzing the first image can include mapping the first image to a color space. In some embodiments, the color space can be a color space other than CIE XYZ. In some embodiments, capturing the first image can include detecting light passing through the color filter array at an image sensor. In some embodiments, analyzing the first image can include comparing the first image to a Macbeth chart. In some embodiments, analyzing the first image can include applying an object detection algorithm to the first image. In some embodiments, analyzing the first image can include applying a color interpolation algorithm to the first image.

BRIEF DESCRIPTION OF THE DRAWINGS/FIGURES

The accompanying drawings, which are incorporated herein and form a part of the specification, illustrate the embodiments and, together with the description, further serve to explain the principles of the embodiments and to enable a person skilled in the relevant art(s) to make and use the embodiments.

FIG. 2 illustrates an example of a Bayer filter, according to an embodiment.

FIG. 3 illustrates a color filter array, according to an embodiment.

FIG. 12 illustrates a reference chart for colors in an automotive application, according to an embodiment.

FIG. 14 illustrates a signal-to-noise performance chart for a color filter array, according to an embodiment.

FIG. 15 illustrates a signal-to-noise performance chart for a color filter array, according to an embodiment.

Figure 1:
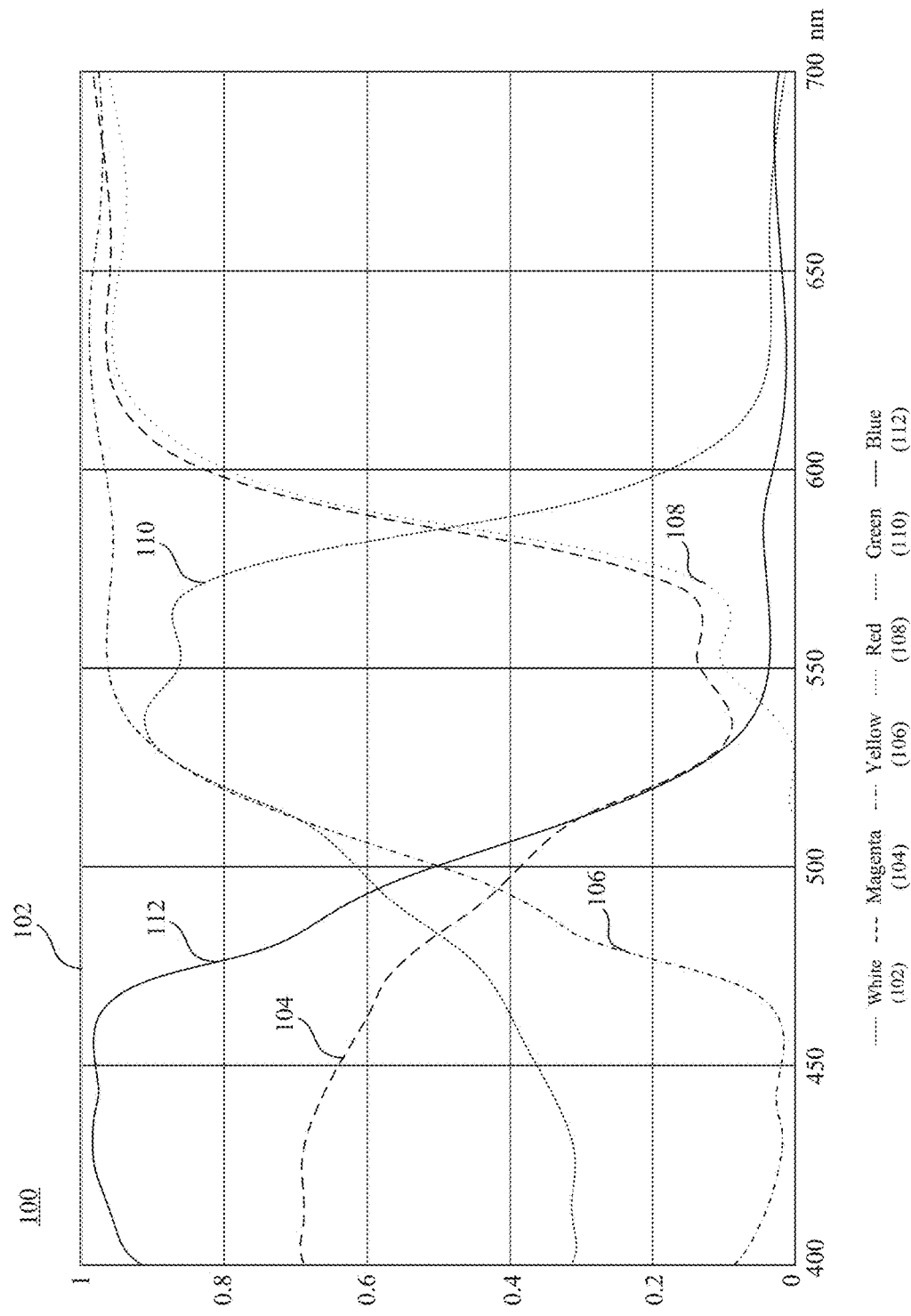
FIG. 1 illustrates a spectral transmission plot, according to an embodiment.

The features and advantages of the embodiments will become more apparent from the Detailed Description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Nighttime driving is a challenging condition for a fully autonomous vehicle using a machine vision system. Nighttime illuminance levels can be less than 1 lux and in some instances as low as 0.0001 lux. In comparison, illuminance on an overcast day is about 1,000 to 2,000 lux and bright sunlight during the day can be more than 100,000 lux. Machine visions systems typically include one or more cameras, which rely on light in order to capture images of the surroundings. In the case of an autonomous vehicle, the vehicle maneuvers (e.g., braking, turning, and accelerating) are ultimately predicated on the information collected by the machine vision system. At night, the low illuminance levels make capturing useful images more challenging.

One way that cameras regulate the light that reaches the image sensor is through the inclusion of a filter. Filters work by passing certain wavelengths of light through the filter, while blocking other wavelengths of light on the spectrum. For example, a red filter allows red light to pass through, while blocking other light. FIG. 1 illustrates a spectral transmission plot 100 that shows the transmission of light through various colored filters. The x-axis represents the light wavelength and the y-axis represents the amount of transmitted light at each wavelength, with "0" indicating that no light is transmitted through the filter at that wavelength and "1" indicating that all or nearly all light is transmitted through the filter at that wavelength.

Shown on spectral transmission plot 100 is data for a white filter 102, magenta filter 104, yellow filter 106, red filter 108, green filter 110, and blue filter 112. As shown in FIG. 1, the colored filters have different spectral transmission characteristics at various wavelengths. These characteristics indicate that certain colored filters are more efficient at blocking light at particular wavelengths. The descriptions below of the spectral transmission characteristics of each filter are provided as general reference approximations and are not meant to be limiting.

White filter 102 is also commonly referred to as a clear filter. The white filter 102 is represented on the spectral transmission plot by the horizontal line at "1" because all or nearly all light is allowed to pass through the white filter 102. Some small portion of light may be reflected or absorbed by white filter 102, so "all" is used synonymously with "nearly all" to describe the light passing through white filter 102. In some instances, white filter 102 is a portion of transparent filter material that does not receive any colored dye during manufacturing.

Magenta filter 104 allows approximately 70% of light between 400-450 nm through the filter, while allowing less than approximately 20% of light between 525-575 nm. Above about 625 nm, the magenta filter allows approximately 95% of light through the filter.

Yellow filter 106 allows less than approximately 10% of the light through the filter between 400-475 nm. The amount of light allowed through yellow filter 106 rapidly increases between 475-525 nm. Above about 525 nm, approximately 95% or more of light is allowed to pass through yellow filter 106.

Red filter 108 allows little or no light to pass through the filter below about 525 nm. The amount of light allowed through red filter 108 rapidly increases between 575-600 nm. Above about 625 nm, approximately 90-95% of light is allowed to pass through red filter 108.

Green filter 110 allows approximately 30-35% of light to pass through the filter between 400-450 nm. The amount of light allowed to pass through green filter 110 increases from 450-525 nm. The peak transmission of green filter 110 is between 525-575 nm, where approximately 80-90% of light is allowed to pass through green filter 110. A sharp drop off occurs above about 575 nm, with only about 5% of light allowed to pass through green filter 110 between 625-700 nm.

Blue filter 112 allows approximately 90% or more light to pass through the filter between 400-475 nm. The amount of light allowed to pass through blue filter 112 decreases from 475-525 nm. Above about 525 nm less than about 5% of light is allowed to pass through blue filter 112.

When considering filters for an imaging system, there are often different criteria depending on the application, for example, a human vision system versus a machine vision system. In a system for human vision, key parameters include color reproduction accuracy, signal-to-noise, and metamerism (i.e., colors with matched appearance in the "RBG" color space values, but with different power spectral response). In a system for machine vision, for example an automotive application, key parameters include color difference discrimination and signal-to-noise. Thus, a color system designed for human vision may have disadvantages in a machine vision application because different parameters may be emphasized in determining the color system.

By way of example, an image capture and processing system for human vision needs to accurately capture and reproduce the full (or largest possible) color gamut visible to humans. The CIE XYZ color space (see FIGS. 9 and 10) has been developed to represent all naturally occurring colors visible to humans. In comparison, an effective automotive machine vision system needs to uniquely identify a much smaller set of reference colors that are commonly encountered in driving scenarios. This system needs to differentiate between these commonly occurring colors under a large set of illuminants. A smaller, more specific color space is preferred, where color differentiation between a limited set of reference color patches is the main performance criteria.

Multiple colored filters can be used in a color filter. The colored filter portions can be arranged in an array having a repeating pattern. One typical filter for standard cameras is commonly referred to as a Bayer filter, which is represented pictorially in FIG. 2. As shown in FIG. 2, a Bayer filter 200 includes two green filter portions 210, a red filter portion 208, and a blue filter portion 212 (i.e., "GRBG," also known as "RGB" in the art). The two green filter portions 210 are located diagonally from each other and the red filter portion 208 and blue filter portion 212 are located diagonally from each other. The green filter portions 210 allow green light to pass through that portion of the Bayer filter 200, while the a red filter portion 208 and a blue filter portion 212 allow red and blue light to pass through their respective portions of the Bayer filter 200. In a typical Bayer filter, about two-thirds of the light reaching the filter is absorbed by each of the green, red, and blue filter portions. Therefore, only about one-third of the light passes through the Bayer filter 200 to reach the image sensor of the camera. During daylight conditions, enough light still reaches the image sensor to produce an image of acceptable color accuracy and resolution. But because so much light is prevented from reaching the image sensor, a camera utilizing a Bayer filter performs poorly in low light conditions, for example, at night. Therefore, a Bayer filter is ill-suited for a machine vision system that operates at night.

Figure 9:
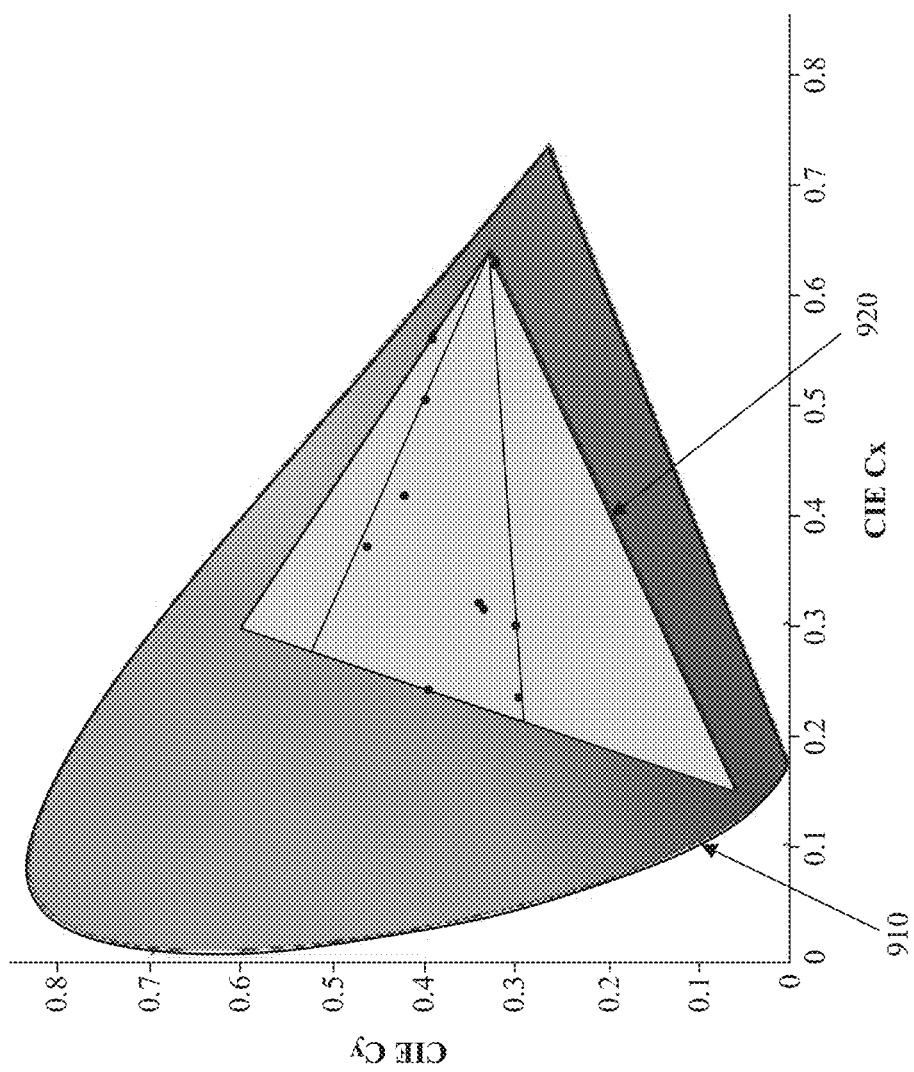
FIG. 9 illustrates a color space for human vision applications, according to an embodiment.

FIG. 9 shows a Bayer filter 200 mapped onto a CIE XYZ color space plot 910, with the resultant RGB color space 920 shown in the triangular area. The bounds of the RGB color space are known in the art. Using a Bayer filter on an imaging sensor in combination with a CIE XYZ color space is often used for human vision applications.

Other types of filters, for example, filters with three clear portions and a red portion (i.e., "CCCR") have been used for low light applications. The CCCR filter, however, oversamples the clear filter portion for an application such as an autonomous vehicle vision system. The reduction in color discrimination in order to increase light sensitivity is such that the system cannot reliably distinguish differences in colors, which is not acceptable for an autonomous vehicle vision system. Furthermore, because the red filter portion blocks about one-third of the light and the clear filter portions let all light through, there is a large signal-to-noise ratio (SNR) for the CCCR filter, which is detrimental in a machine vision system.

FIG. 3 illustrates a color filter array 300, according to an embodiment. Color filter array 300 can be used with any of the devices or systems described herein to improve light sensitivity for the specific applications, for example, a machine vision system. Color filter array 300 includes two white filter portions 302, a yellow filter portion 306, and a magenta filter portion 304 (i.e., "WYMgW"). In some embodiments, the two white filter portions 302 are located diagonally from each other and the magenta filter portion 304 and yellow filter portion 306 are located diagonally from each other.

Color filter array 300 is particularly weft-suited for low light applications because it permits a majority of light to pass through the filter. The yellow filter portion 306 and magenta filter portion 304 each only absorb about one-third of visible spectrum light (i.e., each allows about two-thirds to pass through) and the white filter portions 302 transmit nearly all visible light. Therefore, the WYMgW color filter array 300 has about 3 to 5 times increased light sensitivity in comparison to the Bayer filter 200, significantly improving low light operation. Furthermore, the sensitivity difference between the white filter portions 302 and the yellow filter portion 306 and magenta filter portion 304 is much less than, for example, a white filter and a red, green, or blue filter. Therefore, the WYMgW color filter array 300 provides a better signal-to-noise ratio (SNR) than the Bayer filter 200 and reconstruction errors are reduced upon processing the image.

The WYMgW color filter array 300 will generally have reduced color discrimination, resolution, and color accuracy as compared with the Bayer filter 200. This is generally undesirable for imaging devices that reproduce images, for example, pictures or videos, which are viewed by the human eye. However, in the particular application of autonomous vehicle vision systems, the reduction in these attributes is outweighed by the advantage of increased light sensitivity for low light environments, without significantly affecting daytime operation. The color discrimination, resolution, and color accuracy of the WYMgW color filter array 300 are sufficient to accurately identify objects, while providing the increased light sensitivity for nighttime driving. In the autonomous vehicle vision system application, the system needs the ability to distinguish, for example, traffic lights, traffic signs (e.g., stop signs and yield signs), roadway markings (e.g., white lines, yellow lines, solid lines, and dashed lines), and parking designations (e.g., parking spot lines, handicap markings, and curb colors). An autonomous vehicle vision system does not, for example, need to distinguish fine skin pigment gradients or other subtle shading differences as in traditional photography cameras. So although the images that would be produced by the WYMgW color filter array 300 may not be aesthetically pleasing to the human eye, the tradeoff between the improved light sensitivity and the reduced color discrimination, resolution, and color accuracy is acceptable for the vehicle vision system.

Figure 10:
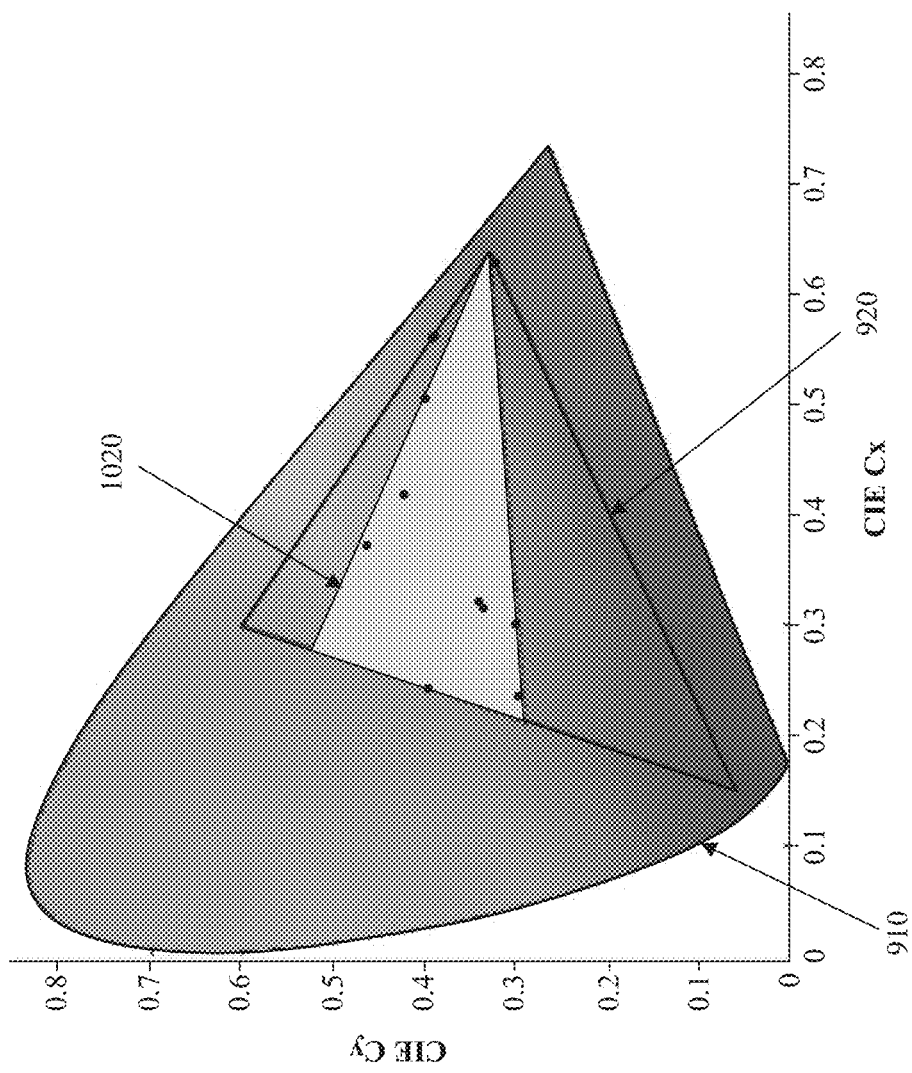
FIG. 10 illustrates a color space for automotive machine vision applications, according to an embodiment.

FIG. 10 shows the WYMgW color filter array 300 mapped onto the CIE XYZ color space plot 910. The resultant Noise Difference Optimized ("NDO") color space 1020 is shown as the highlighted triangular area, which is a subset of the RGB color space 920. As discussed herein, this NDO color space 1020 has been discovered as being particularly useful for automotive machine vision applications.

Figure 4:
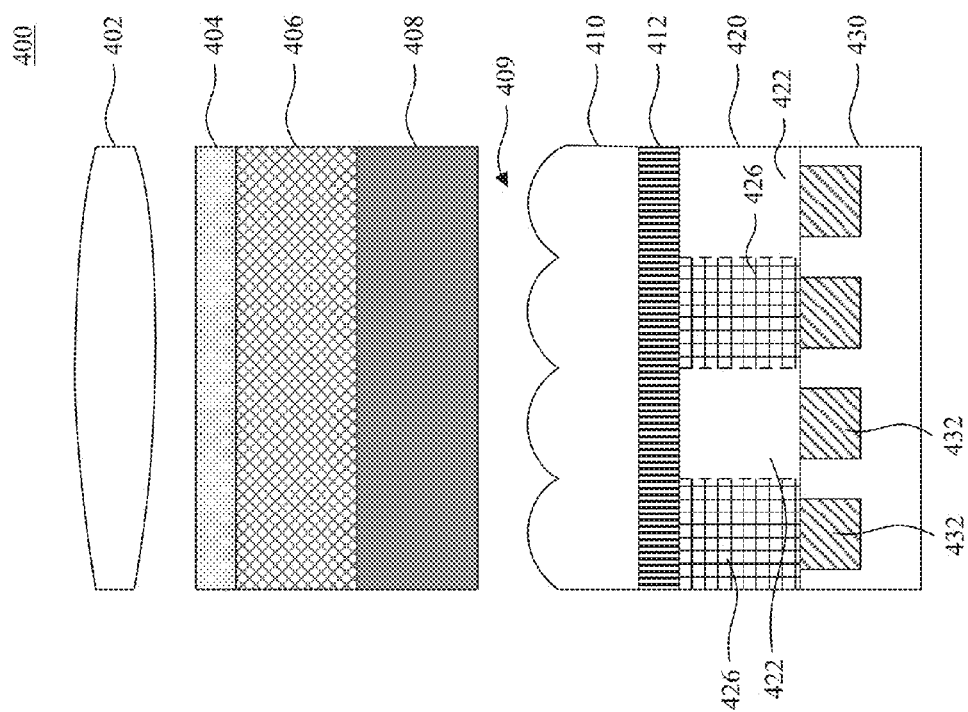
FIG. 4 illustrates an optical stack, according to an embodiment.

FIG. 4 illustrates a cross-sectional view of an optical stack 400, according to an embodiment. Optical stack 400 can be included, for example, in a camera, which can be included, for example, on a vehicle as part of a machine vision system. Based on the components included in optical stack 400, the type and amount of light that ultimately reaches the image sensor 430 can be regulated. In some embodiments, optical stack 400 can include one or more lens 402. The lens 402 can direct the light entering the optical stack 400 toward the image sensor 430. In some embodiments, optical stack 400 can include infrared (IR) filter 406, which can filter infrared light. In some embodiments, a thin film coating 404 can be disposed on IR filter 406. In some embodiments, optical stack 400 can include an optical low pass filter 408, which can reduce the effects of moiré and false color caused by high frequency waves.

In some embodiments, optical stack 400 can include one or more microlens 410. In some embodiments, there can be an air gap 409 between microlenses 410 and, for example, filters 406 and 408. In some embodiments, optical stack 400 can include filter array 420. The microlenses 410 can focus light through the different portions of the filter array 420 and onto the image sensor 430. In some embodiments, a planarization layer 412 can be disposed between microlenses 410 and filter array 420. Planarization layer 412 can provide a smooth interface between filter array 420 and microlenses 410.

In some embodiments, filter array 420 can have a configuration as shown in color filter array 300 of FIG. 3 (i.e., WYMgW). Thus, because of the cross-sectional view of FIG. 4, only white filter portion 422 and yellow filter portion 426 are illustrated. Another cross-section of filter array 420 at a different location would include white and magenta filter portions. In some embodiments, optical stack 400 can include image sensor 430. In some embodiments, image sensor 430 can include one or more pixel 432. In some embodiments, a pixel 432 can be disposed under each of the filter portions of the filter array 420.

In some embodiments, the elements of optical stack 400 can be disposed in the order shown in FIG. 4, although other configurations are contemplated and the example shown in FIG. 4 is not meant to be limiting. In some embodiments, light can pass into the optical stack 400 through lens 402 and optionally through IR filter 406 and/or optical low pass filter 408. The light can then pass through microlenses 410, which focus the light through the filter portions, for example, the white filter portion 422 and yellow filter portion 426 shown in FIG. 4, before the light reaches the individual pixels 432 of image sensor 430. In comparison to, for example, the Bayer filter shown in FIG. 2, significantly more light reaches the image sensor 430 using the WYMgW color filter shown in FIG. 3.

Figure 5A:
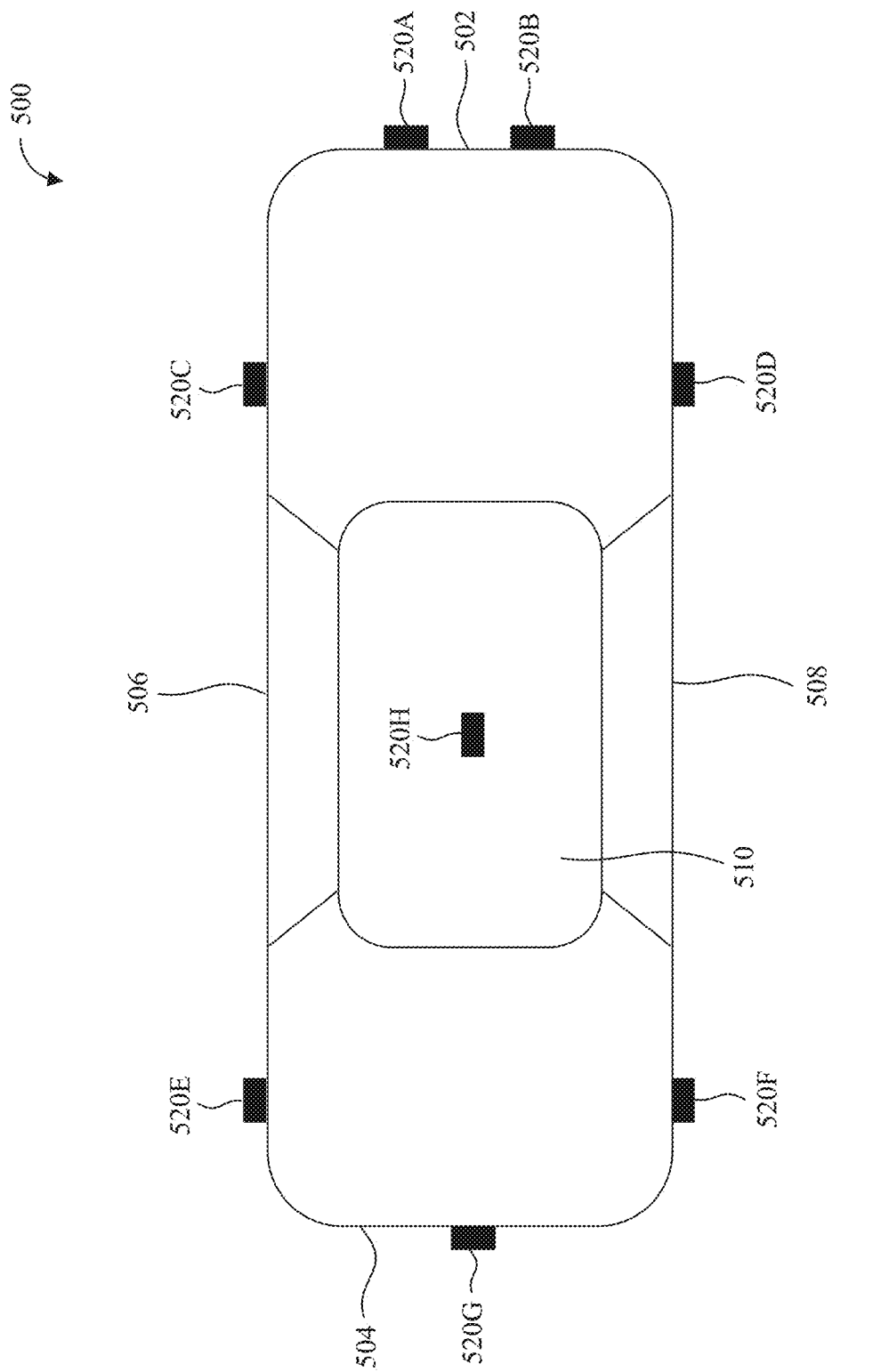
FIG. 5A illustrates a top view of a vehicle, according to an embodiment.
Figure 5B:
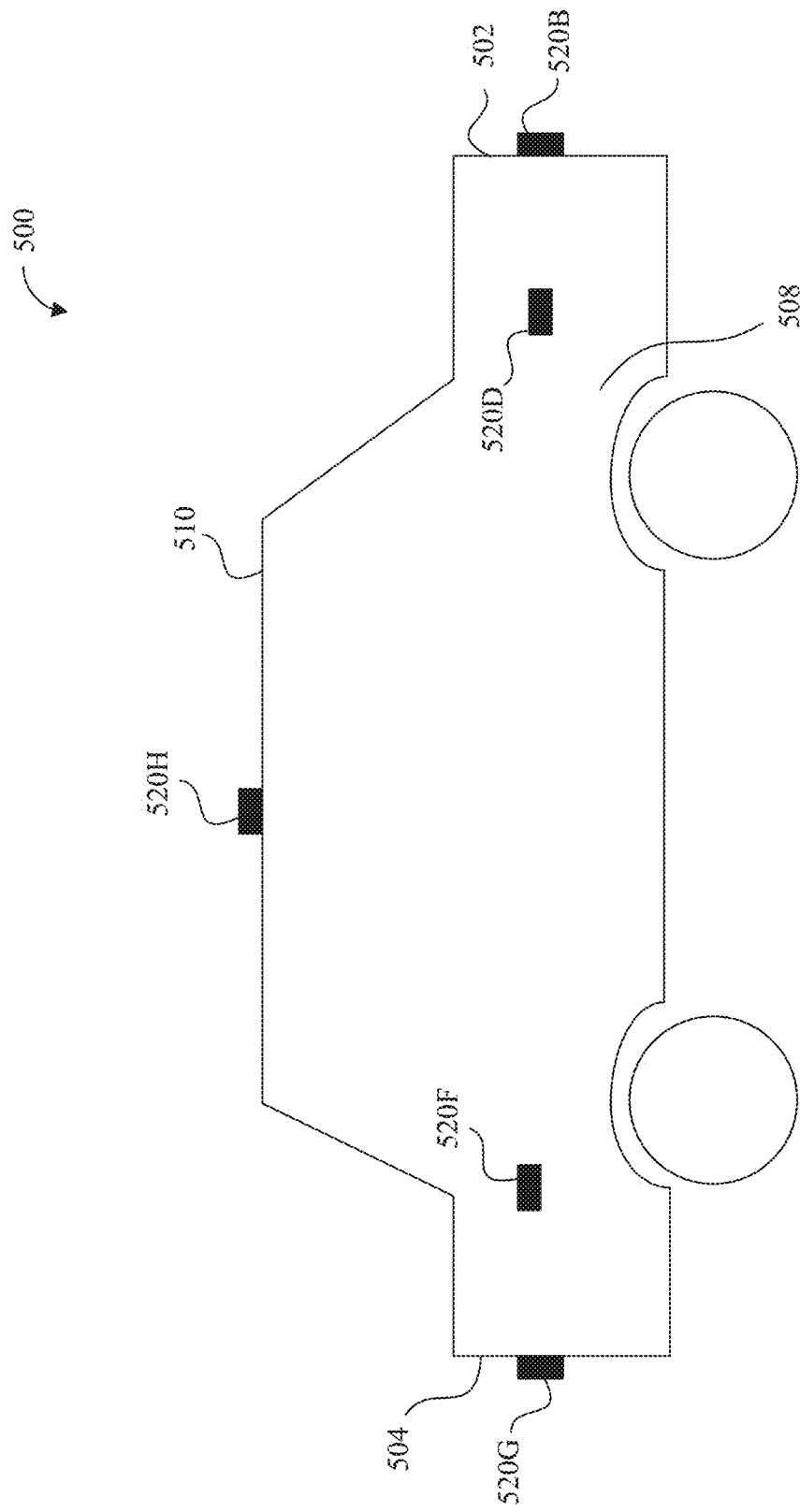
FIG. 5B illustrates a side view of a vehicle, according to an embodiment.

FIGS. 5A and 5B illustrate a top view and a side view, respectively, of a vehicle 500, according to an embodiment. In some embodiments, vehicle 500 can be a motor vehicle, for example, but not limited to, an automobile (e.g., a car, truck, or SUV), a watercraft (e.g., a boat), or an aerial vehicle (e.g., a plane, helicopter, or drone). In a preferred embodiment, vehicle 500 is an autonomous automobile. In some embodiments, vehicle 500 can be an electric vehicle. Vehicle 500 can be configured to carry one or more passengers and/or a cargo load.

In some embodiments, vehicle 500 can include a front portion 502, rear portion 504, driver side 506, passenger side 508, and roof 510. As shown in FIG. 5A, in some embodiments, vehicle 500 can include one or more cameras 520A-H. One or more of the cameras 520A-H can be a camera according to any of the embodiments described herein, for example, having WYMgW color filter array 300 as described herein. As discussed above, this can provide improved low light performance of the vehicle vision system.

Vehicle 500 can include any number of cameras. In some embodiments, cameras 520 can be approximately 2"×2"×2" in size. In some embodiments, cameras 520 can be protected by an additional housing, for example, a transparent covering.

In some embodiments, two cameras 520A and 520B can be disposed on front portion 502 of vehicle 500. In some embodiments, cameras 520A and 520B can have a forward field of view. In some embodiments, one or more cameras 520C and 520E can be disposed on driver side 506 of vehicle 500. In some embodiments, one or more cameras 520D and 520F can be disposed on passenger side 508 of vehicle 500. In some embodiments, one or more camera 520G can be disposed on rear portion 504 of vehicle 500. In some embodiments, one or more camera 520H can be disposed on roof 510 of vehicle 500. The fields of view of the cameras can be adjusted depending on the desired coverage of the vision system. In some embodiments, the image information captured by the cameras of vehicle 500 can facilitate autonomous driving of vehicle 500.

Figure 6:
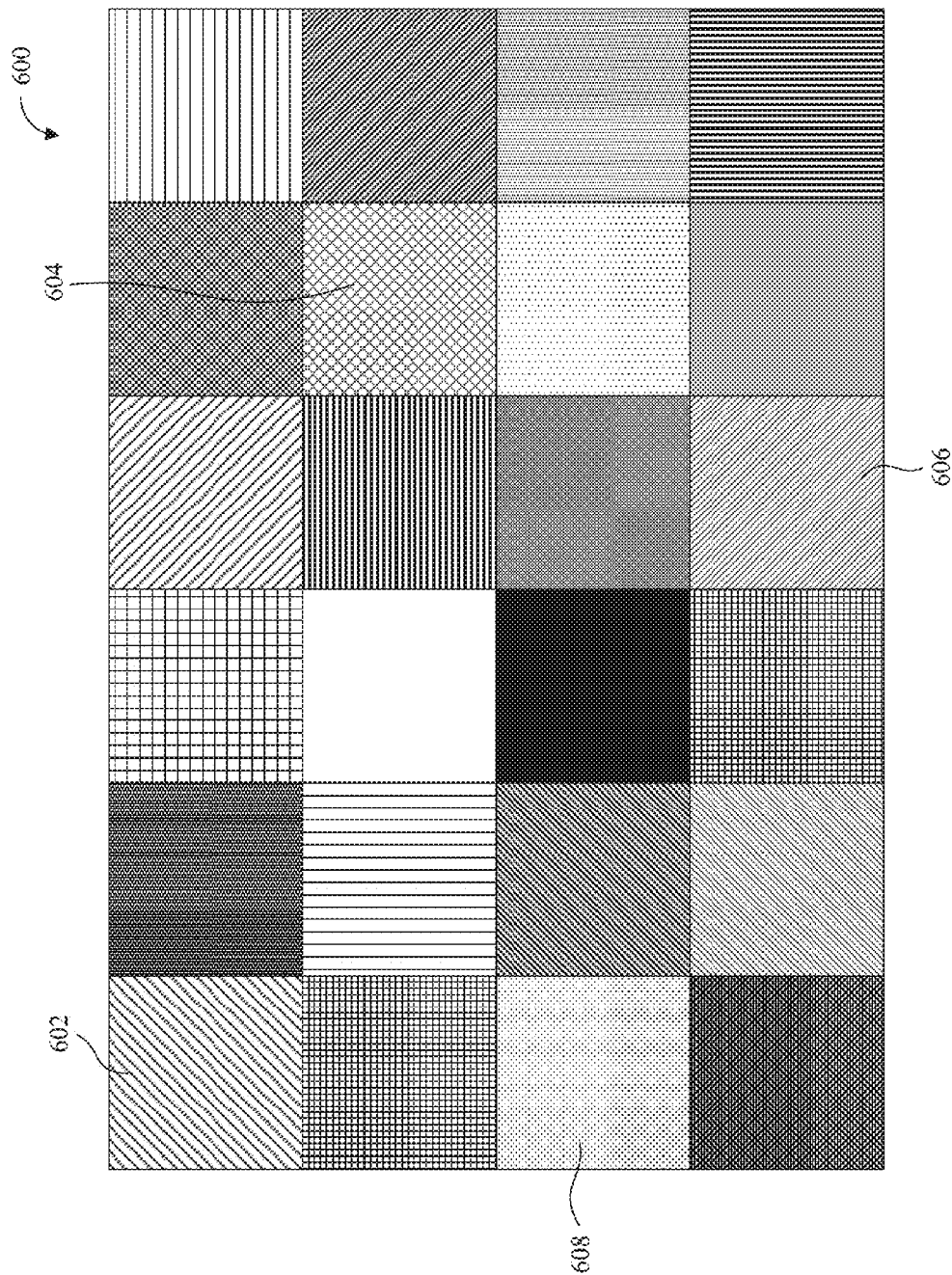
FIG. 6 illustrates a Macbeth chart, according to an embodiment.
Figure 11:
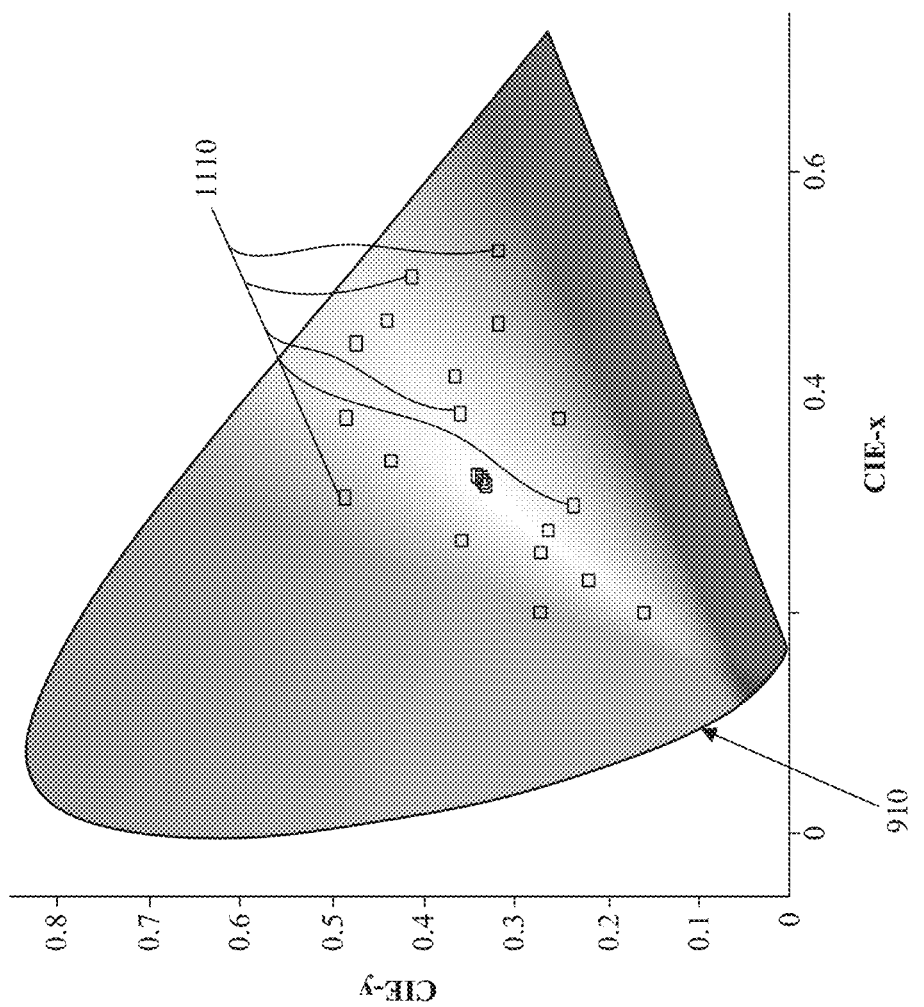
FIG. 11 illustrates a color checker plot, according to an embodiment.

FIG. 6 illustrates an embodiment of what is commonly referred to as a Macbeth chart 600. A Macbeth chart is a traditional method used to quantify a system's ability to reproduce color. Typically, a Macbeth chart includes color patches with different spectral reflectance values selected to mimic reflectance of important objects for human observers. Color systems' "Delta-E" deviation (a metric for understanding how the human eye perceives color difference) from a reference CIE XYZ value can be calculated for each patch and the better system is the one with the smaller error. An imaging system designed for human vision will minimize the Delta-E error relative to the Macbeth color checker chart under relevant illumination. For example, FIG. 11 illustrates the color patches 1110 of a standard Macbeth chart plotted on the CIE XYZ color space 910.

As shown in FIG. 6, Macbeth chart 600 can include a number of subdivided portions. Each portion can represent a different color having a spectral reflectance intended to mimic those of objects such as human skin, the sky, foliage, flowers, etc. For example, Macbeth chart 600 can include a first color 602, a second color 604, a third color 606, a fourth color 608, etc. In some embodiments, Macbeth chart 600 can include 24 different color sections, as shown in FIG. 6. Each color section can represent a typical color captured by a camera, for example, a camera in a vehicle vision system. These colors can be pre-selected for use in Macbeth chart 600 for the specific application environment. For example, first color 602 can represent tree bark, second color 604 can represent grass, third color 606 can represent a stop sign, and fourth color 608 can represent a human skin tone. Images captured by a camera, for example, cameras 520A-H can be compared to Macbeth chart 600 to determine the degree of color accuracy of the machine vision system.

Figure 13:
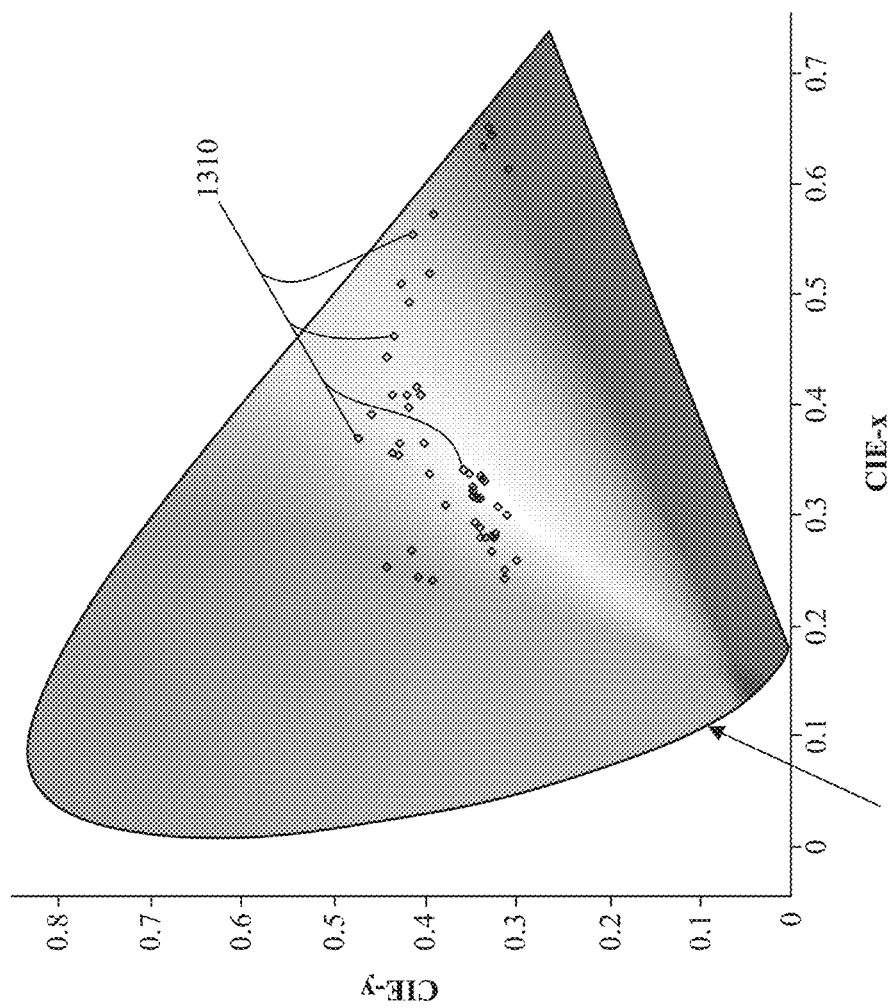
FIG. 13 illustrates a color checker plot, according to an embodiment.

For the instant application directed to automotive machine vision, a new "automotive reference color chart" has been developed based on studying a full set of commonly occurring colors in automotive applications and selecting the 10 most representative values. The Cx and Cy values of each of these colors from the CIE XYZ chart are provided in FIG. 12 and incorporated by reference herein. For example, the Cx and Cy values are provided for the red color of an ambulance, black asphalt, and a yellow lane marker, among other important object colors in automotive machine vision settings. FIG. 13 illustrates these color patches 1310 of the automotive reference color chart chart plotted on the CIE XYZ color space 910.

As discussed above, in a system where operation under low light conditions represents a significant challenge, signal-to-noise ("SNR") becomes the main factor determining the system's ability to differentiate between colors. FIGS. 14 and 15 illustrate low light (2 lux) simulations using a Bayer (RGB) filter (see FIG. 2) and a WYMgW filter (see FIG. 3), respectively. A higher SNR value indicates better performance (e.g., higher signal and less noise). As indicated in FIG. 14, the average SNR for the RGB filter capture without applying a color correction matrix (CCM) is approximately 5.5833. When applied to the CIE XYZ color space with a CCM, the average SNR drops to approximately 4.7916. In comparison, as shown in FIG. 15, the average SNR for the WYMgW filter without applying a CCM is approximately 17.9583. When applied to the CIE XYZ color space with a CCM, as would be done for a typical human vision system, the average SNR drops to approximately 3.3333. But when applied to the NDO color space discussed above regarding FIG. 10 for the present automotive machine visions system, the average SNR increases to approximately 19.4583. Thus, by developing a system solution based on a WYMgW color filter array and an image processing chain using a CCM designed for the NDO color space, the end-to-end SNR is significantly improved, thereby enabling low light imaging for automotive applications.

Figure 16:
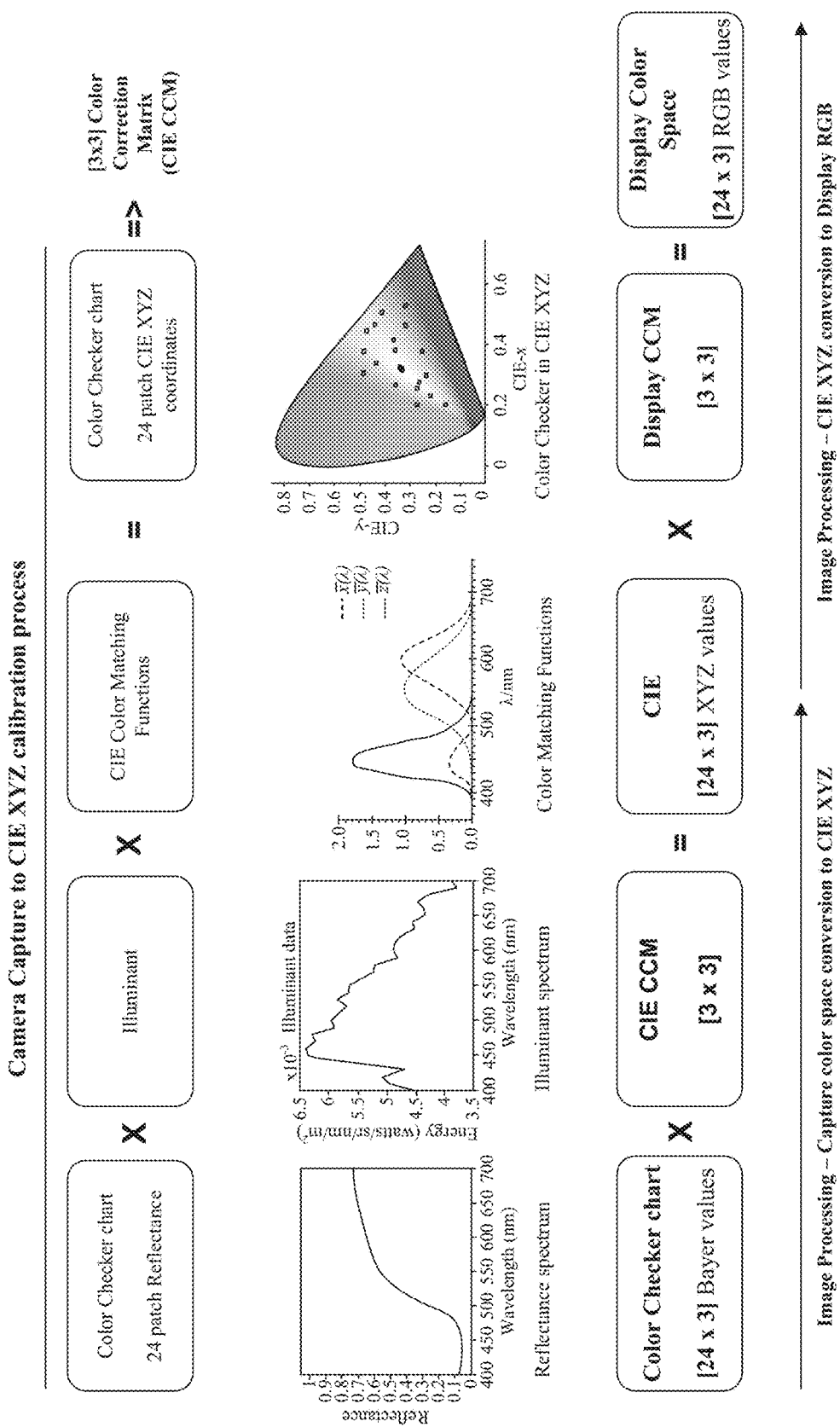
FIG. 16 illustrates an image processing chain, according to an embodiment.

FIG. 16 illustrates a method for CCM calculation. A complete image processing chain includes CIE-based calibration as well as multiple color space transforms (e.g., reflectance spectrum, illuminant spectrum, and color matching functions) for human vision and the target display color space. Each of the transforms reduces SNR in order to improve capture to display color reproduction. But an imaging system for automotive applications will use different criteria and color space to maintain the highest SNR possible.

Figure 7:
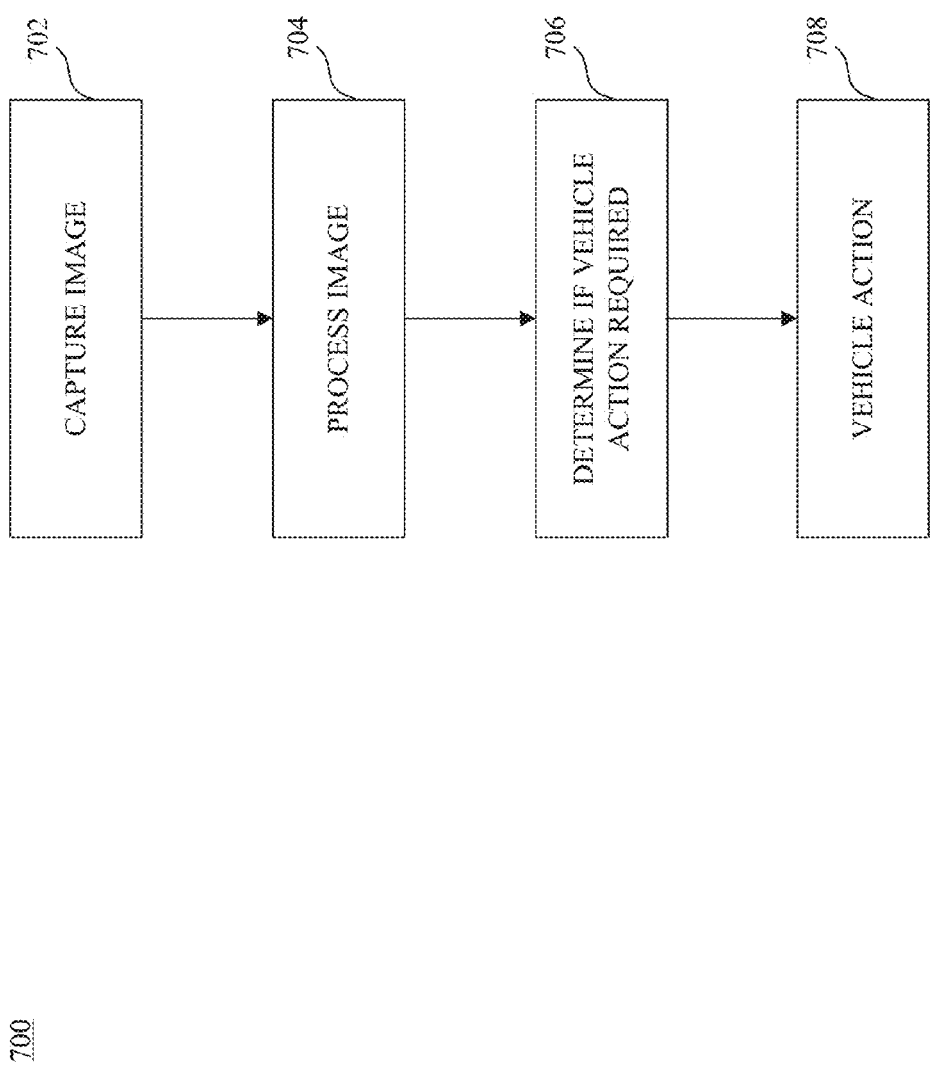
FIG. 7 illustrates a method of operating a vehicle, according to an embodiment.

FIG. 7 illustrates a method of operating a vehicle, according to an embodiment. In some embodiments, the vehicle can be an autonomous vehicle. At step 702, an image can be captured. For example, an image can be captured by a camera disposed on a vehicle. In some embodiments, the camera can include a WYMgW color filter as described herein, for example, with respect to FIG. 3. At step 704, the image can be processed. For example, the image can be processed by a central processing unit. In some embodiments, the image processing can include color mapping the image to a specific color space. Some imaging systems map the image to the CIE XYZ color space, which is intended to represent the colors seen by an average human eye. Because the machine vision systems described herein function differently than a human eye, in some embodiments, the image can be mapped to a color space other than CIE XYZ. For example, the image can be mapped to the NDC color space discussed above regarding FIG. 10.

At step 706, the central processing unit, for example, can determine whether a vehicle action is required. For example, if the processed image indicates a vehicle is stopped in pathway of travel, the central processing unit can determine that the vehicle should execute a vehicle maneuver. At step 708, a vehicle action can be taken, if necessary. For example, the vehicle may brake, accelerate, and/or turn.

Figure 8:
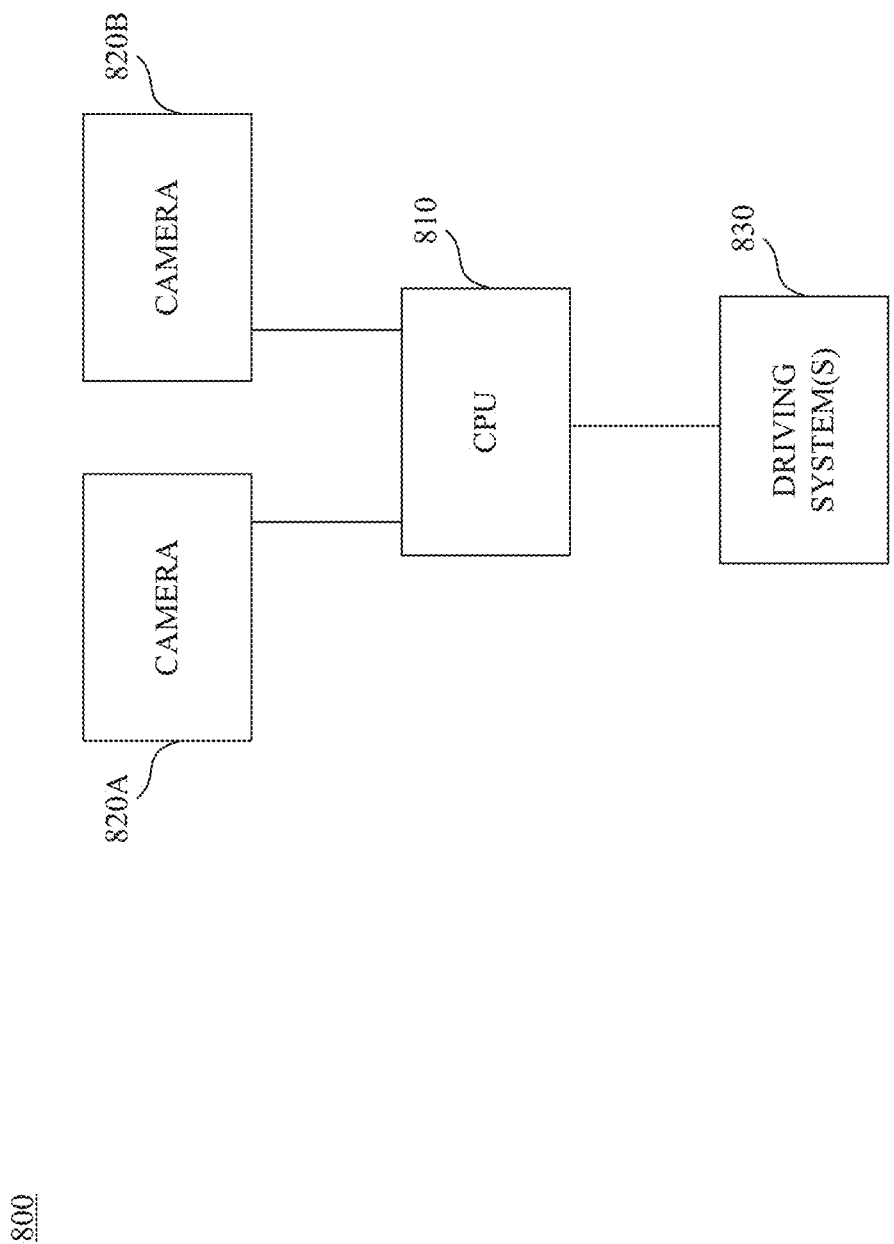
FIG. 8 illustrates a schematic of a vehicle vision system, according to an embodiment.

FIG. 8 illustrates a schematic of a vehicle vision system 800, according to an embodiment. Vehicle vision system 800 can include one or more cameras as described herein, for example, two cameras 820A and 820B. In some embodiments, cameras 820A and 820B can be coupled to central processing unit (CPU) 810. Cameras 820A and 820B can be wired or wirelessly coupled to CPU 810. In some embodiments, CPU 810 can be a computing device having, for example, one or more processors and memory. In some embodiments, the functions of CPU 810 can be distributed across multiple processors. In some embodiments, each camera can be coupled to a separate CPU. In some embodiments, each camera can be coupled to the same CPU. In some embodiments, CPU 810 can be the central control for an entire system, for example, an autonomous vehicle. In some embodiments, CPU 810 can be coupled to one more driving system 830. For example, driving systems 830 can include, but are not limited to, braking systems, a steering system, an accelerator, and light systems (e.g., turn signals or headlights). In some embodiments, CPU 810 can store and execute algorithms to detect objects, for example, vehicles, traffic signals, roadway marking, people, trees, etc.

Other embodiments and combinations of elements described in the present disclosure are contemplated, for example, as provided in the following clauses:

1. A method of operating an autonomous vehicle, comprising:
    capturing a first image with a camera having a color filter array comprising a section having a first white filter portion, a yellow filter portion, a magenta filter portion, and a second white filter portion;
    analyzing the first image with a central processing unit; and
    determining whether a vehicle maneuver is required.
2. The method of clause 1, further comprising executing a vehicle maneuverer.
3. The method of clauses 1-2, wherein the vehicle maneuver is at least one of accelerating, braking, or turning.
4. The method of clauses 1-3, wherein analyzing the first image comprises mapping the first image to a color space.
5. The method of clause 4, wherein the color space comprises a color space other than CIE XYZ.
6. The method of clauses 1-5, wherein capturing the first image comprises detecting light passing through the color filter array at an image sensor.

7. The method of clauses 1-6, wherein analyzing the first image comprises comparing the first image to a Macbeth chart.

8. The method of clauses 1-7, wherein analyzing the first image comprises applying an object detection algorithm to the first image.

9. The method of clauses 1-8, wherein analyzing the first image comprises applying a color interpolation algorithm to the first image.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the devices, systems, and methods such that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A machine vision system, comprising:
a first camera configured to be coupled to a vehicle, the camera having an optical stack comprising:
a color filter array having a plurality of sections, each section comprising:
a first white filter portion,
a yellow filter portion,
a magenta filter portion, and
a second white filter portion,
wherein the first camera is coupled to a central processing unit of the vehicle, wherein the central processing unit is configured to send vehicle maneuver instructions in response to image data received from the first camera, and
wherein the machine vision system is configured to provide information to the vehicle to operate the vehicle along a path.

2. The machine vision system of claim 1, wherein the first white filter portion and the second white filter portion are disposed diagonally with respect to each other.

3. The machine vision system of claim 1, wherein the optical stack further comprises a lens and an image sensor.

4. The machine vision system of claim 3, wherein the image sensor comprises a plurality of pixels, and wherein each pixel has a section of the color filter array disposed over the pixel.

5. The machine vision system of claim 1, wherein the optical stack comprises, in order, a lens, an infrared filter, a microlens layer, the color filter array, and an image sensor.

6. The machine vision system of claim 1, wherein the central processing unit is configured to analyze an image captured by the first camera.

7. The machine vision system of claim 6, wherein the central processing unit is configured to identify at least one of a vehicle, a street light, a traffic sign, and a roadway marking in the image captured by the first camera.

8. The machine vision system of claim 6, wherein the central processing unit is configured to analyze the image captured by the first camera using a noise difference optimized color space.

9. The machine vision system of claim 6, wherein the central processing unit is configured to analyze the image captured by the first camera using an automotive reference color chart.

10. The machine vision system of claim 1, wherein the first camera is configured to operate in lighting conditions of less than 1 lux.

11. The machine vision system of claim 1, further comprising a second camera configured to be coupled to the vehicle, the second camera having a second optical stack, comprising:
a second color filter array having a plurality of sections, each section comprising:
a third white filter portion,
a second yellow filter portion,
a second magenta filter portion, and
a fourth white filter portion.

12. The machine vision system of claim 11, wherein the second camera is coupled to the central processing unit of the vehicle, and wherein the central processing unit is configured to send vehicle maneuver instructions in response to image data received from the second camera.

13. The machine vision system of claim 1, wherein the vehicle is an autonomous vehicle.

14. An autonomous vehicle, comprising:
a plurality of cameras, wherein a first camera comprises:
a color filter array having a plurality of sections, each section comprising:
a first white filter portion,
a yellow filter portion,
a magenta filter portion, and
a second white filter portion; and
a central processing unit of the vehicle, wherein the first camera is coupled to the central processing unit of the vehicle,
wherein the first camera is configured to provide information to the central processing unit of the vehicle, and
wherein the central processing unit is configured to send vehicle maneuver instructions in response to image data received from the first camera to operate the autonomous vehicle along a path.

15. The autonomous vehicle of claim 14, wherein the first camera is configured to operate in lighting conditions of less than 1 lux.

16. The autonomous vehicle of claim 14, wherein the first camera is disposed on a front end of the vehicle.

17. The autonomous vehicle of claim 14, wherein the central processing unit is configured to detect at least one of a vehicle, a street light, a traffic sign, and a roadway marking from the image data.

18. The autonomous vehicle of claim 14, wherein the autonomous vehicle is an electric vehicle.

19. A machine vision system, comprising:
a first camera configured to be coupled to a vehicle, the camera having an optical stack comprising:

a color filter array having a plurality of sections, each section comprising:
a first white filter portion,
a yellow filter portion,
a magenta filter portion, and
a second white filter portion,
wherein the first camera is configured to operate in lighting conditions of less than 1 lux, and
wherein the machine vision system is configured to provide information to the vehicle to operate the vehicle along a path.

20. The machine vision system of claim 19, wherein the first camera is coupled to a central processing unit of the vehicle, wherein the central processing unit is configured to send vehicle maneuver instructions in response to image data received from the first camera.

21. The machine vision system of claim 20, wherein the central processing unit is configured to detect at least one of a vehicle, a street light, a traffic sign, and a roadway marking from the image data.

22. The machine vision system of claim 19, wherein the first camera is disposed on a rear portion of the vehicle.

23. The machine vision system of claim 22, further comprising a second camera disposed on a front portion of the vehicle.

* * * * *